(12) United States Patent
Klinkenberger et al.

(10) Patent No.: US 7,712,781 B2
(45) Date of Patent: May 11, 2010

(54) PROTECTIVE CUSHION WRAP WITH SLIP FEATURE

(75) Inventors: Amy L. Klinkenberger, Highland, MI (US); Brent T. Elkin, Imlay City, MI (US)

(73) Assignee: TK Holdings Inc., Auburn Hills, MI (US)

( * ) Notice: Subject to any disclaimer, the term of this patent is extended or adjusted under 35 U.S.C. 154(b) by 0 days.

(21) Appl. No.: 12/232,426

(22) Filed: Sep. 17, 2008

(65) Prior Publication Data

US 2010/0066059 A1 Mar. 18, 2010

(51) Int. Cl.
*B60R 21/16* (2006.01)

(52) U.S. Cl. .................................. 280/743.1

(58) Field of Classification Search .............. 280/743.1, 280/743.2, 731, 732, 728.1, 729, 733, 739
See application file for complete search history.

(56) References Cited

U.S. PATENT DOCUMENTS

| | | | |
|---|---|---|---|
| 5,154,444 A | 10/1992 | Nelson | |
| 5,452,913 A | 9/1995 | Hansen et al. | |
| 5,560,648 A * | 10/1996 | Rhule et al. | 280/731 |
| 5,603,523 A | 2/1997 | Rhule et al. | |
| 5,618,595 A * | 4/1997 | Matsushima et al. | 428/35.2 |
| 5,630,614 A * | 5/1997 | Conlee et al. | 280/730.1 |
| 5,765,867 A | 6/1998 | French | |
| 5,775,733 A | 7/1998 | Lunt et al. | |
| 5,813,696 A | 9/1998 | Hill | |
| 5,823,566 A | 10/1998 | Manire | |
| 6,070,904 A * | 6/2000 | Ozaki et al. | 280/743.1 |
| 6,364,349 B1 | 4/2002 | Kutchey et al. | |
| 6,371,510 B1 * | 4/2002 | Marriott et al. | 280/730.1 |
| 6,443,483 B2 | 9/2002 | Ellerbrok | |
| 6,460,880 B1 | 10/2002 | Gallagher et al. | |
| 6,474,686 B1 * | 11/2002 | Higuchi et al. | 280/743.1 |
| 6,715,791 B2 | 4/2004 | Keshavaraj | |
| 6,874,810 B2 | 4/2005 | Soderquist | |
| 6,877,772 B2 | 4/2005 | Fischer et al. | |
| 6,929,281 B2 | 8/2005 | Loeper et al. | |
| 6,942,242 B2 | 9/2005 | Hawthorn et al. | |
| 7,021,653 B2 | 4/2006 | Burdock et al. | |
| 7,396,044 B2 * | 7/2008 | Bauer et al. | 280/743.2 |
| 2003/0189319 A1 | 10/2003 | Soderquist | |
| 2004/0232662 A1 | 11/2004 | Loeper et al. | |
| 2005/0067819 A1 | 3/2005 | Segura | |
| 2005/0184487 A1 | 8/2005 | Lanzinger et al. | |
| 2006/0049618 A1 | 3/2006 | Bito | |
| 2006/0125215 A1 | 6/2006 | Clarke et al. | |
| 2006/0249932 A1 | 11/2006 | Marriott | |

* cited by examiner

*Primary Examiner*—Faye M. Fleming
(74) *Attorney, Agent, or Firm*—Foley & Lardner LLP

(57) ABSTRACT

An airbag apparatus includes an airbag module. The airbag module includes an inflatable cushion coupled to an inflator and a retainer. The airbag module additionally includes a cushion wrap. The cushion is folded such that it is in a storage position. The cushion wrap includes a slip section and a retainer end portion. The retainer end portion is affixed to the retainer and disposed adjacent to the slip section. The slip section includes a folded portion and frangible end portion. The folded portion is disposed between the frangible end portion and the retainer end portion. Furthermore, the frangible end portion is affixed to the retainer.

13 Claims, 5 Drawing Sheets

PROTECTIVE CUSHION WRAP WITH SLIP FEATURE

BACKGROUND

The present invention relates generally to the field of vehicle airbags. More specifically, the present invention relates to a vehicle airbag with a deployment feature. The deployment feature being a cushion wrap with a slip feature that provides a surface to serve as a guide for an airbag cushion to glide over an obstruction the airbag may encounter during deployment.

Vehicle airbags are used to protect vehicle occupants from injury in the event of a vehicle crash. Current airbag designs incorporate a variety of components that enhance the performance of the airbag: number and configuration of cushion folding techniques; tethers; venting positions; and tear seams included for the passive venting of the airbag.

In light of the above, there remains a continuing need in the art for improved airbag systems that are simple to install. There is also a need in the art for improved airbag systems that exhibit robust mechanical performance.

SUMMARY

An exemplary embodiment relates to an airbag module that includes a retainer, an airbag, and an inflator to inflate the airbag. The airbag includes a cushion wrap with a slip feature, i.e., a deployment control flap, to control the trajectory of the airbag such that the airbag will deploy upwards and laterally to left and right sides.

The cushion wrap is attached to the airbag module by two or more anchor flaps at the retainer fastener elements, that align and control the position of the folded portion of the slip section. The anchor flaps have a frangible portion that, on deployment, will break and allow the slip section to provide a gliding surface for the cushion.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Figure 1:
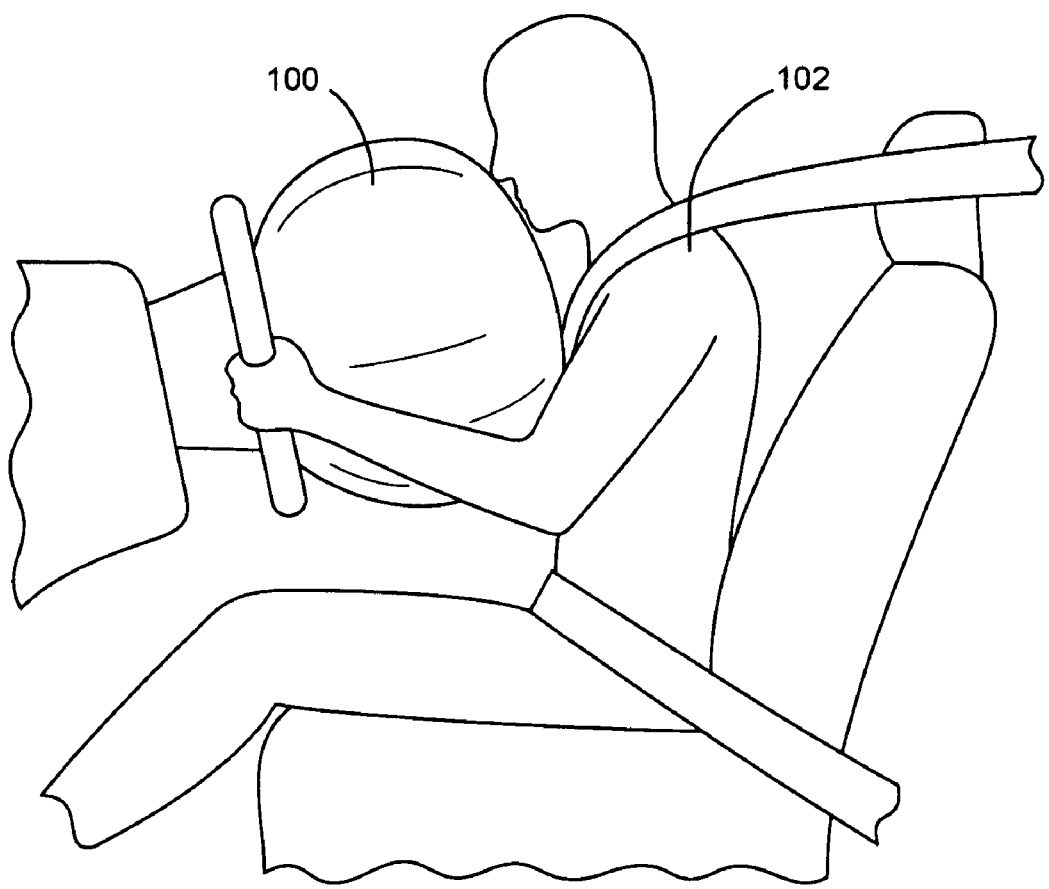
FIG. 1 is a side view of a vehicle including an airbag and an adult occupant.

An airbag is provided in vehicles for the protection of occupants in the event of a vehicle crash. The airbag is configured to rapidly inflate in a space between the vehicle occupant and the vehicle dash, pillar, or other structure. Airbags are generally most effective when the occupant is restrained in the vehicle by a safety device such as a safety belt (e.g., an "in-position" situation). However, in some scenarios, an occupant may not be restrained and may be closer to the vehicle dash or other structure during the vehicle crash (e.g., an "out-of-position" situation). In other scenarios, the vehicle may be occupied by a child in a child safety seat.

The embodiment described below can allow for a low risk deployment of the airbag in a mid-mount configuration. While the airbag mechanism is described below as a dash-mounted airbag, it should be understood by those skilled in the art that the inventive concepts may be applied to any suitable airbag and such airbags may be located in a variety of locations within the vehicle (e.g., a side curtain airbag, a seat-mounted side impact airbag, a driver-side airbag, etc.).

The airbag includes an inflatable cushion and an inflator. The cushion is generally formed with at least two panels of a suitable material, such as nylon. The panels are coupled together with a sewn or woven seam to form at least one inflatable chamber. The cushion may be divided into two or more chambers. Passages or ports are generally between individual chambers such that the chambers are in fluid communication with each other. The cushion is folded and concealed under a trim panel or other covering (cover) in a storage position. The inflator, such as a conventional pyrotechnic inflator, supplies gas for inflation/deployment of the restraint cushion. During a vehicle crash or rollover event, the inflator is activated to supply pressurized gas to inflate the cushion. The inflation gas enters the cushion and drives the airbag cushion away from the storage position and into the deployed position. In the deployed position, the cushion is disposed between the occupant and a structural member of the vehicle such as the vehicle dash. The airbag may further include a bag wrap (e.g., cushion wrap) or other protective covering that surrounds the cushion in the storage position and as the cushion deploys.

If the vehicle seat is occupied by a child safety seat, the airbag cushion deployment is modified by the slip section portion of a cushion wrap, i.e., a deployment control flap. In the initial stage of deployment, the center of the deploying airbag cushion may be restricted by the deployment control flap, changing the trajectory of the cushion such that the cushion may deploy upwardly and laterally to the right and left sides rather than being directly projected at the center of a backrest of a child seat.

As the airbag cushion continues to deploy, the deployment control flap unfolds in the direction of the trajectory of the deploying cushion. The initially restricted center of the cushion follows the unfolding deployment control flap. As the deployment control flap unfolds and unfurls, the tear section, located proximate to the upper flap mounting, yields under the tension of the cushion on the flap. The yielding of the tear section then causes the restriction produced by the deployment control flap to be progressively removed, starting at the top and moving toward the bottom. If the deployment control flap comes in contact with the back of a high backed convertible child seat, the restriction on the main panel of the cushion at the bottom is largely maintained. As a result, the bag trajectory is modified in a more upward direction. In addition to the backed traditional child seat, the flap will roll out over the child seat, thereby modifying the airbag trajectory such that the deploying cushion passes above the child seat.

The cushion wrap with slip section is attached at two or more anchor points on the module. The cushion wrap with slip feature is attached to the module by anchor flaps that align and control the position of the folded portion of the slip section. The anchor flaps have a frangible portion that, on deployment, will break and allow the slip section to provide a surface for the cushion to glide over obstructions that may be encountered during deployment.

The attachment method to the module by frangible anchor flaps allows for use with a machine folded cushion. Both ends of the protective wrap with slip section are attached to two or more anchor points on the module. The cushion wrap with slip feature can be added to any cushion after the folding process, e.g., geometric or machine fold. The anchor flaps align and control the position of the folded portion of the feature section during module manufacturing and until a deployment event. The cushion wrap with slip feature is not fold dependant and may be used with a traditional geometric folded cushion.

Reference will now be made to the FIGURES.

FIG. 1 shows a side view of a vehicle including a deployed inflatable cushion 100 according to the prior art, and as employed in the instant invention. The cushion 100 can be a driver's side airbag, a passenger airbag, side airbag, etc. Cushion 100 can be used in a plurality of vehicles, including cars, trucks, vans, SUVs, buses, RVs, etc. Cushion 100 is provided to protect an occupant 102 of the vehicle in a collision. Furthermore, cushion 100 may be stored in an airbag module 200 (FIGS. 2a, 2b).

Additionally, cushion 100 is formed from a multitude of fabric panels, folded and concealed under a trim panel or other covering in a storage position. Cushion 100 includes an opening or mouth that is coupled to a stationary object such as a mounting bracket and allows inflating gas from an inflator to enter cushion 100. The inflator, such as a conventional pyrotechnic inflator, supplies gas for inflation/deployment of cushion 100.

Figure 2A:
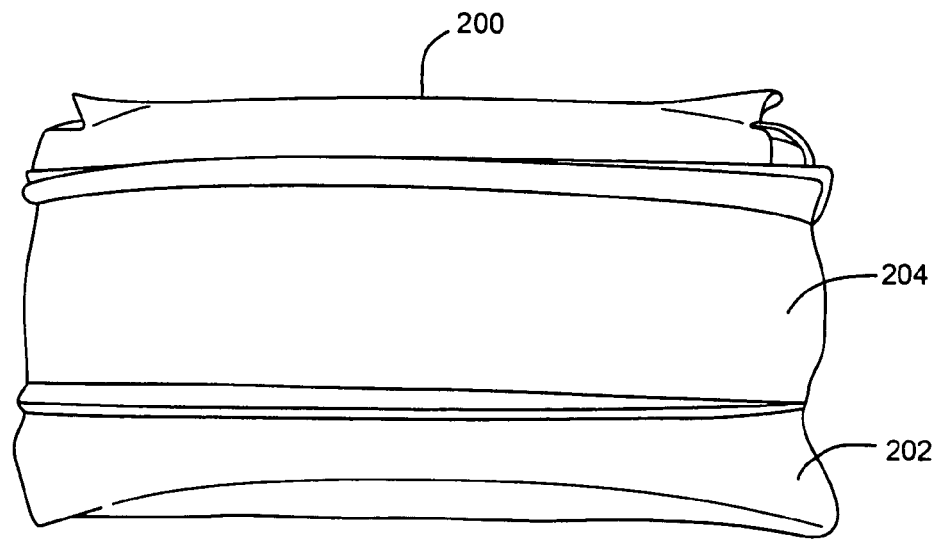
FIGS. 2a and 2b show an airbag module in the storage position, according to an exemplary embodiment.
Figure 2B:
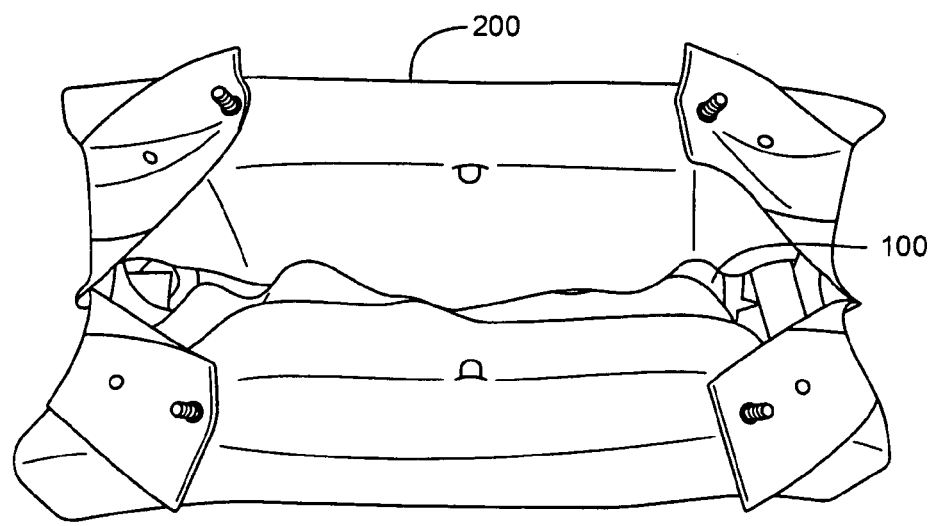

FIGS. 2a and 2b illustrate an airbag module 200 in the storage position, according to an exemplary embodiment. FIG. 2a is a front view of an airbag module 200. FIG. 2b is a rear view of an airbag modules 200. Airbag module 200 includes an inflatable cushion 100, an inflator (not shown) to inflate cushion 100, a cushion wrap 202 that surrounds and retains cushion 100 when the cushion 100 is in a storage configuration, the cushion wrap comprising deployment control flap 204 to direct the deployment of cushion 100.

Figure 5A:
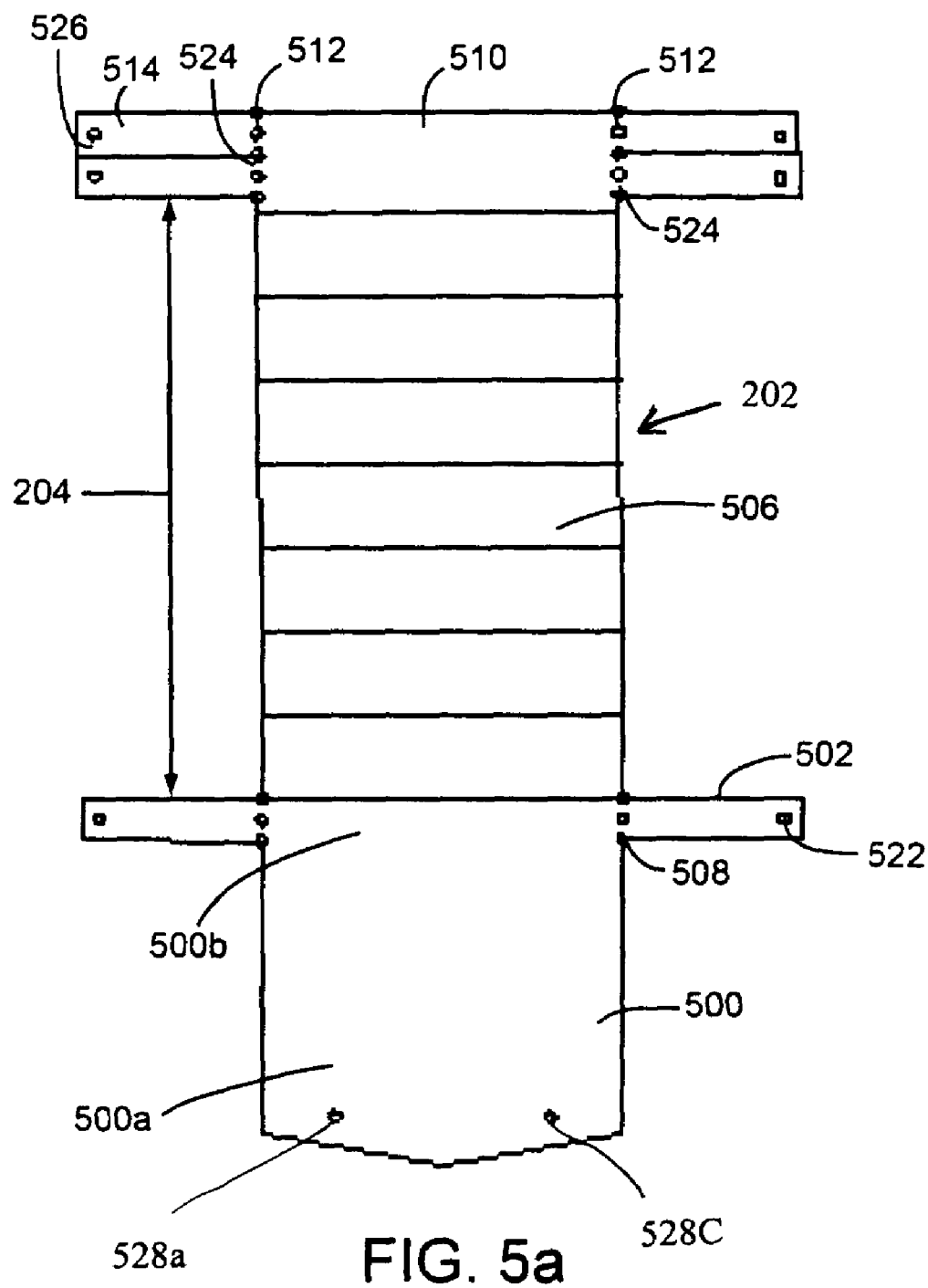
FIGS. 5a, 5b, and 5c show a deployment control flap, according to an exemplary embodiment.
Figure 5B:
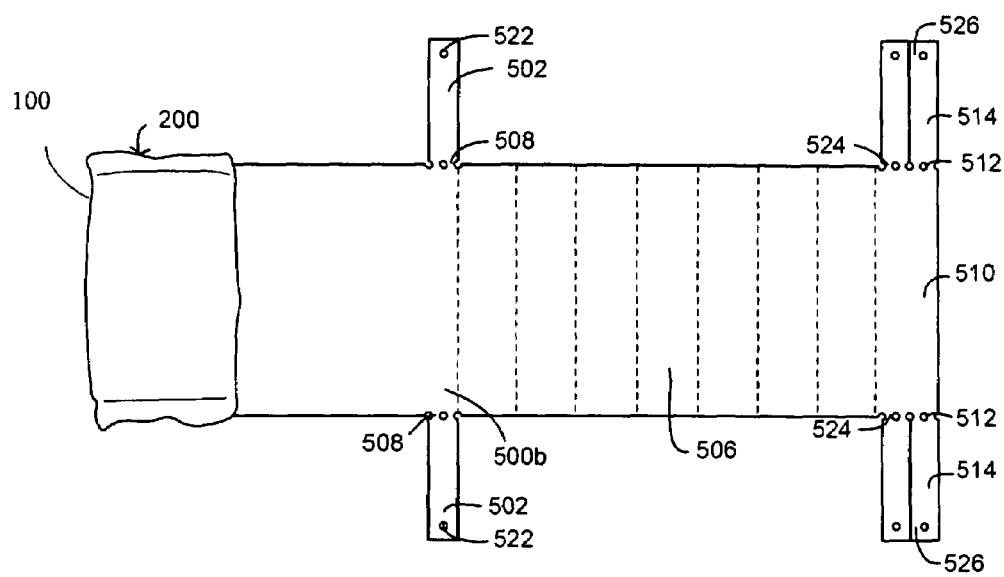
Figure 5C:
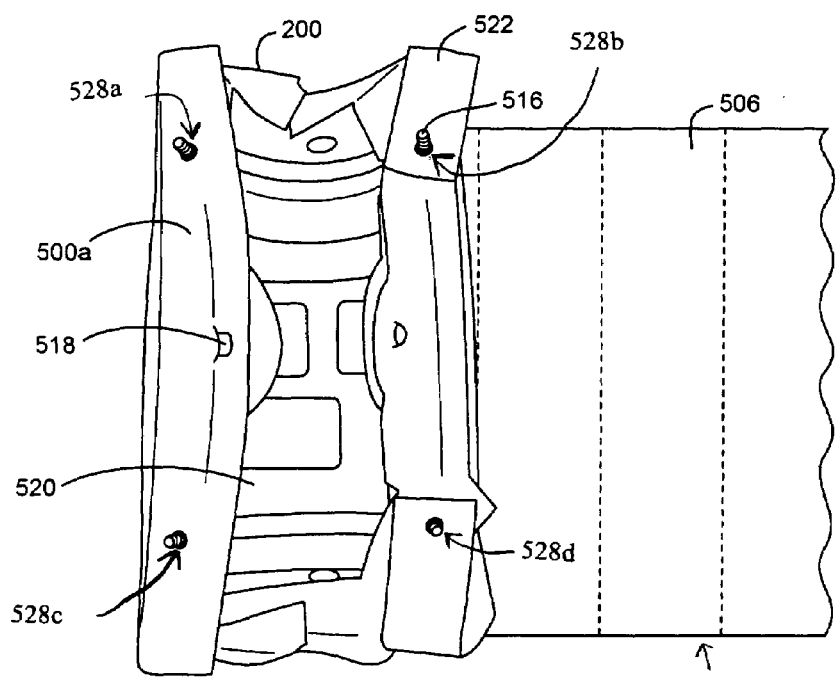

Airbag module 200 may be mounted in the vehicle dash with a retainer 520 (FIG. 5c). According to various exemplary embodiments, airbag module 200 may be mid-mounted on the dash of the vehicle, or may be top-mounted on the dash of the vehicle or the airbag module 200 may be mounted in any other suitable location in the vehicle.

Figure 3:
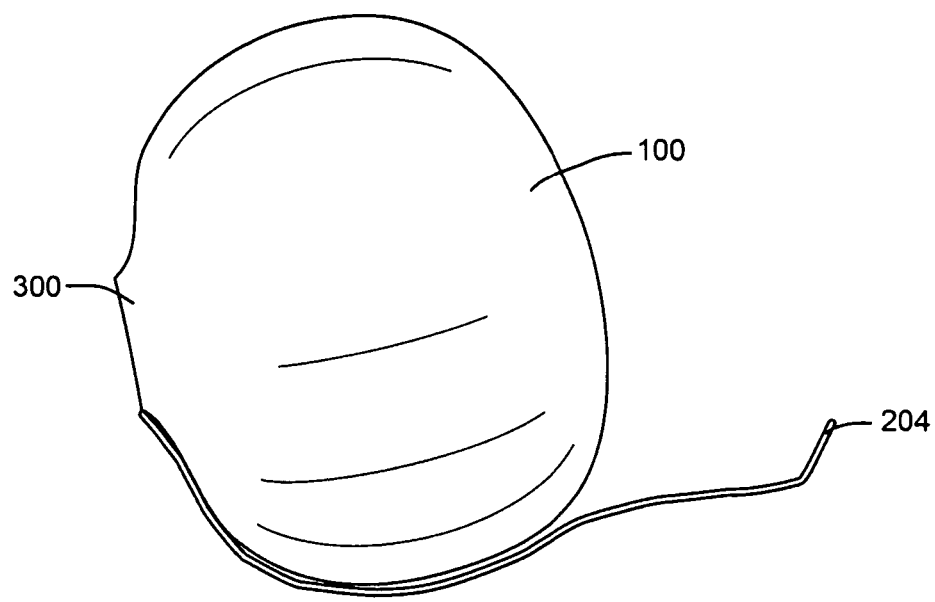
FIG. 3 shows a deployed airbag cushion employing a slip feature, according to an exemplary embodiment.

Referring to FIG. 3, an inflatable cushion 100 is shown in the deployed position, according to an exemplary embodiment. During a vehicle crash or rollover event, the inflator is activated to supply pressurized gas to inflate cushion 100. The inflation gas enters the cushion 100 and drives cushion 100 away from the storage position of FIGS. 2a, 2b and into the deployed position, FIG. 3. In the deployed position, the cushion 100 is disposed between the occupant 102 and a structural member of the vehicle such as the vehicle dash. A diffuser may be attached to the top and bottom of the throat 300 of cushion 100 and cause the gas produced by the inflator to be directed laterally to the side panels of cushion 100.

One end of deployment control flap 204 is coupled to airbag module 200 and redirects cushion 100 in certain deployment scenarios. Deployment control flap 204 restricts, in the initial stage of deployment, the center of the deploying cushion 100, changing the trajectory such that the cushion 100 may deploy upwardly and/or laterally to the right and left sides.

Figure 4:
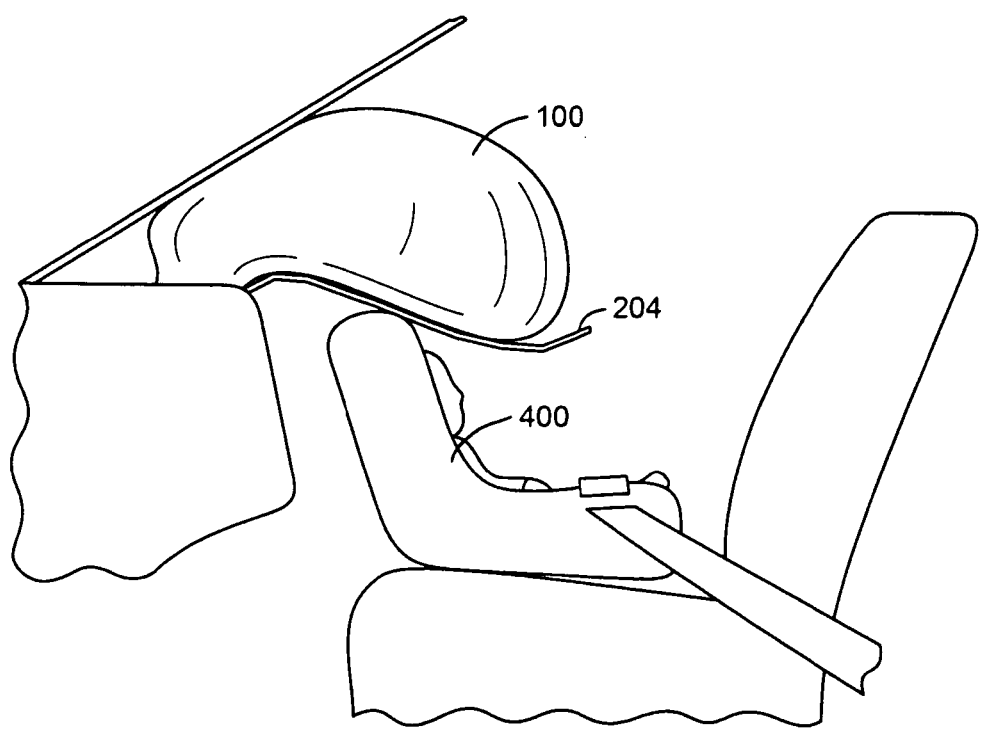
FIG. 4 shows an inflating airbag cushion contacting an out of position occupant, according to an exemplary embodiment.

Referring to FIG. 4, an inflating cushion 100 is shown contacting an out-of-position occupant, according to an exemplary embodiment. An out-of-position occupant 400 may be an occupant not wearing a seat belt or otherwise located too close to the inflating cushion 100, or a rear-facing child seat. When the inflating cushion 100 contacts an out-of-position occupant, the deployment control flap 204 redirects the direction of inflation of cushion 100 so the cushion 100 is directed up and/or to the side rather than directly at the center of a backrest of a child seat or out-of-position occupant. Additionally, the length of deployment control flap 204 may be adjusted for alternate applications.

Referring to FIGS. 5a, 5b, and 5c a cushion wrap 202 comprising a deployment control flap 204 is shown according to an exemplary embodiment. Deployment control flap 204 is an elongated fabric panel that may be formed from the same material as cushion 100 (e.g., nylon) or any other suitable material. A retainer end portion 500 of deployment control flap 204 is coupled to retainer fastener elements 516, and center tab 518 that are provided to couple airbag module 200 to the vehicle. The retainer end portion 500 has a retainer end portion first side 500a and a retainer end portion positioning side 500b. The retainer fastener elements 516 may be embodied by studs, or any other suitable expedient. Deployment control flap 204 includes a folded section 506, and positioning flaps 502. The positioning flaps having positioning flap frangible ends 508 and positioning flap retainer attachments 522 at the frangible end portion 510, proximate to the folded section 506 as shown in FIG. 5b. Positioning flaps 502 may be coupled to any of the retainer fastener elements 516 such that the positioning flaps 502 may further redirect the direction of inflation of cushion 100. Positioning flap frangible ends 508 include weakening features 512 shown as a slit, cut, or holes formed in deployment control flap 204. Weakening features 512 provide a weakened portion that allows the positioning flap frangible ends 508 to rupture when inflating cushion 100 presses against deployment control flap 204. The pressure needed to rupture tear section 508 and, therefore, the amount of time deployment control flap 204 restrains an inflating cushion 100 may be modified by changing the size, number, and/or spacing of weakening features 512.

Similarly, at the frangible end portion 510, proximate to the folded section, are located anchor flaps 514. The anchor flaps have anchor flap frangible ends 524 possessing weakening features 512 and anchor flap retainer attachment ends 526. These frangible ends 524 are affixed to the deployment control flap 204 and the retainer attachment ends 526 are affixed to the retainer 520 by retainer fastening elements 516.

As best seen in FIG. 5c, the retainer 520 has at least four attachment regions: a first attachment region 528a, a second attachment region 528b, a third attachment region 528c, and a fourth attachment region 528d. In each attachment region is located at least one retainer fastening element 516.

It is important to note that the construction and arrangement of the protective wrap with slip feature as shown in the various exemplary embodiments are illustrative only. Although only a few embodiments have been described in detail in this disclosure, those skilled in the art who review this disclosure will readily appreciate that many modifications are possible (e.g., variations in sizes dimensions, structures, shapes and proportions of the various elements, values of parameters, mounting arrangements, use of materials, colors, orientations, etc.) without materially departing from the novel teachings and advantages of the subject matter recited in the description. For example, elements shown as integrally formed may be constructed of multiple parts or elements, the position of the element may be reversed or otherwise varied and the nature of number of discrete elements or positions may be altered or varied. Other substitutions, modifications, changes and omissions may be made in the design, operating conditions and arrangement of the exemplary embodiments.

What is claimed is:

1. An airbag apparatus, comprising:
   an airbag module including an inflatable cushion coupled to an inflator and a retainer, wherein the cushion is folded such that it is in a storage position; and
   a cushion wrap comprising a deployment control flap, wherein the cushion wrap has a retainer end portion being affixed to the retainer and disposed adjacent to the deployment control flap,
   the deployment control flap including a folded portion and a frangible end portion, the folded portion being disposed between the frangible end portion and the retainer end portion,
   wherein the frangible end portion is affixed to the retainer,
   wherein the deployment control flap is configured to direct a trajectory of the airbag deployment laterally and upwardly,
   wherein the retainer end portion has a first side and a positioning side,
   the first side being fastened to the retainer,
   the positioning side having positioning flaps,
   the positioning flaps each having a retainer attachment end and a frangible end, wherein the frangible end is affixed to the positioning side and the retainer attachment end is affixed to the retainer, and
   wherein the frangible end portion is affixed to the retainer by anchor flaps, the anchor flaps each having a retainer attachment end and a frangible end, wherein the frangible end is affixed to the deployment control flap and the retainer attachment end is affixed to the retainer.

2. The airbag apparatus of claim 1, wherein, along a perimeter of the retainer there are at least four attachment regions,
   wherein the retainer comprises a first retainer fastening element in a first attachment region, a second retainer fastening element in a second attachment region, a third retainer fastening element in a third attachment region, and a fourth retainer fastening element in a fourth attachment region,
   and wherein the frangible end portion of the deployment control flap is fastened to the retainer by said first and third retainer fastening elements, the retainer attachment ends of the positioning flaps are respectively fastened to the retainer by said second and fourth retainer fastening elements, and the retainer attachment ends of the anchor flaps are respectively fastened to the retainer by said first, second, third and fourth retainer fastening elements.

3. The airbag apparatus of claim 2, wherein said cushion comprises at least two panels of material, the panels being coupled to form at least one inflatable chamber.

4. The airbag apparatus of claim 3, the panels being coupled to form at least two inflatable chambers, the chambers being in fluid communication with each other.

5. The airbag apparatus of claim 1, wherein the apparatus is configured for use as a driver's side airbag, a passenger's side airbag, a knee airbag, airbag or side airbag.

6. The airbag apparatus of claim 1, wherein the material of the airbag cushion has a low coefficient of friction, and
   wherein cushion wrap is composed of a material having a low coefficient of friction.

7. The airbag apparatus of claim 1, wherein a width of the deployment control flap and a width of the cushion wrap are substantially the same.

8. A vehicle occupant protection apparatus, comprising:
   an inflatable airbag operable to deploy in the event of a vehicle crash,
   said airbag including a cushion wrap having a deployment control flap configured such that it adjusts the trajectory of airbag deployment in order to reduce the incidence and/or severity of deleterious airbag impacts,
   wherein the deployment control flap is configured to direct a trajectory of the airbag deployment laterally and upwardly,
   wherein said deployment control flap includes a folded portion that is configured to unfurl in the direction of the deployment trajectory, and
   wherein said deployment control flap comprises a folded portion, the folded portion having a first end and a second end, said first end having frangible positioning flaps, said second end having frangible anchor flaps, and said positioning flaps and anchor flaps being attached to the retainer and configured to align and control the position of the folded portion prior to airbag deployment.

9. The vehicle occupant protection apparatus of claim 8, wherein said deployment control flap is operable to tear away from the frangible positioning flaps and frangible anchor flaps upon airbag deployment.

10. The vehicle occupant protection apparatus of claim 9, wherein the retainer attachment ends of the anchor flaps, the retainer attachment ends of the positioning flaps remain affixed to the retainer after deployment of the airbag cushion.

11. The vehicle occupant protection apparatus of claim 10, wherein said deployment control flap is configured to provide a gliding surface for the airbag cushion.

12. The vehicle occupant protection apparatus of claim 11, wherein the deployment control flap is configured to initially restrict expansion in the central region of the airbag upon deployment of the airbag.

13. The vehicle occupant protection apparatus of claim 11,
   wherein the deployment control flap is configured to initially restrict expansion in the central region of the airbag upon deployment of the airbag, and
   wherein the deployment control flap is configured to direct the trajectory of airbag deployment longitudinally and either one of right or left.

* * * * *